US011006807B2

(12) United States Patent
Fox et al.

(10) Patent No.: US 11,006,807 B2
(45) Date of Patent: May 18, 2021

(54) WET ROBOT DOCKING STATION

(71) Applicant: iRobot Corporation, Bedford, MA (US)

(72) Inventors: Levi Fox, Salem, MA (US); Marcus R. Williams, Medford, MA (US); Yanhan Li, Belmont, MA (US); Jason Jeffrey Suchman, Arlington, MA (US); Lucile Driscoll, Boston, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 16/544,227

(22) Filed: Aug. 19, 2019

(65) Prior Publication Data
US 2020/0000305 A1 Jan. 2, 2020

Related U.S. Application Data

(63) Continuation of application No. 15/693,349, filed on Aug. 31, 2017, now Pat. No. 10,383,499.

(51) Int. Cl.
*A47L 11/40* (2006.01)
*B25J 9/00* (2006.01)
(Continued)

(52) U.S. Cl.
CPC ......... *A47L 11/4091* (2013.01); *A47L 11/24* (2013.01); *A47L 11/28* (2013.01); *A47L 11/4005* (2013.01);
(Continued)

(58) Field of Classification Search
CPC ...... A47L 11/4091; A47L 11/24; A47L 11/28; A47L 11/4005; A47L 11/4011;
(Continued)

(56) References Cited

U.S. PATENT DOCUMENTS

D510,066 S  9/2005 Hickey et al.
7,332,890 B2  2/2008 Cohen et al.
(Continued)

FOREIGN PATENT DOCUMENTS

CN 102961085   3/2013
CN 104586324 A  5/2015
EP  3165146 A1  5/2017

OTHER PUBLICATIONS

International Preliminary Report on Patentability in International Appln. No. PCT/US2018/049110, dated Mar. 3, 2020, 6 pages.
(Continued)

*Primary Examiner* — Yazan A Soofi
(74) *Attorney, Agent, or Firm* — Fish & Richardson P.C.

(57) ABSTRACT

The present disclosure provides a base station for receiving a mobile cleaning robot including a docking structure. The docking structure includes a horizontal surface and at least two electrical charging contacts, each of the electrical charging contacts having a contact surface positioned above the horizontal surface. The base station also includes a platform that is connectable to the docking structure. The platform includes a raised rear surface having a front portion and a rear portion, two wheel wells located in the front portion of the raised rear surface of the platform, and a plurality of raised surface features forward of the raised rear surface configured to support an underside portion of the mobile cleaning robot.

25 Claims, 12 Drawing Sheets

(51) Int. Cl.
*G05D 1/02* (2020.01)
*B25J 19/00* (2006.01)
*A47L 11/28* (2006.01)
*A47L 11/24* (2006.01)
*B25J 11/00* (2006.01)
*B60L 53/14* (2019.01)

(52) U.S. Cl.
CPC ....... *A47L 11/4011* (2013.01); *A47L 11/4061* (2013.01); *A47L 11/4072* (2013.01); *A47L 11/4083* (2013.01); *A47L 11/4088* (2013.01); *B25J 9/0003* (2013.01); *B25J 11/0085* (2013.01); *B25J 19/005* (2013.01); *B60L 53/14* (2019.02); *G05D 1/0225* (2013.01); *A47L 2201/022* (2013.01); *A47L 2201/04* (2013.01); *G05D 2201/0203* (2013.01)

(58) Field of Classification Search
CPC ............. A47L 11/4061; A47L 11/4072; A47L 11/4083; A47L 11/4088; B25J 9/0003
USPC .......................................................... 701/22
See application file for complete search history.

(56) References Cited

U.S. PATENT DOCUMENTS

| | | | |
|---|---|---|---|
| 8,390,251 B2 | 3/2013 | Cohen et al. | |
| 8,461,803 B2 | 6/2013 | Cohen et al. | |
| 8,749,196 B2 | 6/2014 | Cohen et al. | |
| 8,825,256 B2 | 9/2014 | Kim et al. | |
| 8,854,001 B2 | 10/2014 | Cohen et al. | |
| 9,178,370 B2 | 11/2015 | Henricksen et al. | |
| 9,215,957 B2 | 12/2015 | Cohen et al. | |
| 9,468,349 B2 * | 10/2016 | Fong | B25J 9/1664 |
| 9,550,294 B2 | 1/2017 | Cohen et al. | |
| 9,884,423 B2 | 2/2018 | Cohen et al. | |
| 9,931,750 B2 | 4/2018 | Cohen et al. | |
| 2005/0156562 A1* | 7/2005 | Cohen | H02J 7/0026 320/107 |
| 2007/0061040 A1* | 3/2007 | Augenbraun | A47L 5/225 700/245 |
| 2009/0281661 A1* | 11/2009 | Dooley | B60L 53/14 700/258 |
| 2012/0013907 A1* | 1/2012 | Jung | A47L 9/28 356/438 |
| 2013/0098401 A1* | 4/2013 | Yoon | A47L 11/4072 134/18 |
| 2013/0221908 A1 | 8/2013 | Tang | |
| 2016/0091899 A1* | 3/2016 | Aldred | B60L 1/003 701/23 |
| 2016/0183752 A1* | 6/2016 | Morin | A47L 9/1666 134/18 |
| 2016/0278596 A1 | 9/2016 | Janzen et al. | |
| 2017/0150862 A1* | 6/2017 | Machida | A47L 9/28 |
| 2017/0164797 A1* | 6/2017 | Abramson | B08B 3/04 |
| 2018/0014709 A1* | 1/2018 | O'Brien | A47L 9/2884 |
| 2018/0188737 A1* | 7/2018 | Won | G05D 1/0234 |
| 2018/0236663 A1 | 8/2018 | Cohen et al. | |
| 2018/0246518 A1* | 8/2018 | Vogel | G05D 1/0274 |
| 2019/0059680 A1 | 2/2019 | Fox et al. | |

OTHER PUBLICATIONS

[No Author Listed], "Roborock Robotic Vacuum Cleaner Manual," Roborock Manual S50, 18 pages.
International Search Report and Written Opinion in International Application No. PCT/US2018/49110, dated Nov. 20, 2018, 6 pages.

* cited by examiner

WET ROBOT DOCKING STATION

CROSS-REFERENCE TO RELATED APPLICATIONS

This application is a continuation of and claims priority to U.S. application Ser. No. 15/693,349, filed on Aug. 31, 2017, the entire contents of which are hereby incorporated by reference.

TECHNICAL FIELD

This specification relates generally to robotic cleaning systems, and more particularly to systems and techniques for docking mobile cleaning robots.

BACKGROUND

Mobile cleaning robots can autonomously perform cleaning tasks within an environment, e.g., a home. Many kinds of mobile cleaning robots are autonomous to some degree and in different ways. For example, an autonomous cleaning robot may be designed to automatically dock with a base station for the purpose of charging.

SUMMARY

In one aspect, a base station for receiving a mobile cleaning robot is featured. The base station includes a docking structure. The docking structure includes a horizontal surface and at least two electrical charging contacts, each of the electrical charging contacts having a contact surface positioned above the horizontal surface. The base station also includes a platform that is connectable to the docking structure. The platform includes a raised rear surface having a front portion and a rear portion, the rear portion configured to be substantially co-planar with the horizontal surface of the docking structure when the platform is connected to the docking structure, two wheel wells located in the front portion of the raised rear surface of the platform, each wheel well having a recessed surface being configured to receive a wheel of the robot, the recessed surface of each wheel well having raised tread to complement grooves of the respective wheels of the robot, and a plurality of raised surface features forward of the raised rear surface configured to support an underside portion of the mobile cleaning robot.

In some implementations, the underside portion of the mobile cleaning robot includes a cleaning pad configured to hold liquid.

In some implementations, the underside portion of the mobile cleaning robot includes a cleaning pad holder.

In some implementations, the underside portion of the mobile cleaning robot includes a debris pushing structure.

In some implementations, the plurality of raised surface features causes the received mobile cleaning robot to tilt into a charging position. In some cases, when the mobile cleaning robot is in the charging position, one of the at least two electrical charging contacts experiences at least one pound of downward force, wherein the mobile cleaning robot has a weight of between 2 and 3 pounds.

In some implementations, each of the at least two electrical contacts is connected to an extension spring.

In some implementations, the contact surfaces of each of the at least two electrical charging contacts have a domed geometry.

In some implementations, the platform further includes at least two bumpers on the raised rear surface, the bumpers being located to guide the robot into a charging position. In some cases, the bumpers have a height between 18 and 50 mm. In some cases, the bumpers include sloping side walls for directing the wheels of the mobile cleaning robot into the wheel wells.

In some implementations, the raised surface features are arranged in a pattern to allow wheels of the mobile cleaning robot to traverse a portion of the platform.

In some implementations, the wheel wells have a depth of between 4 and 8 mm.

In some implementations, the at least two electrical charging contacts are positioned such that a highest point of each contact surface is between 4 and 8 mm above the horizontal surface.

In some implementations, the docking structure and the platform are connectable via a locking feature.

In some implementations, a front edge of the platform has a height less than a height of the raised rear surface of the platform.

In another aspect, a base station for receiving a mobile cleaning robot includes a docking structure. The docking structure includes a horizontal surface and at least two electrical charging contacts, each of the electrical charging contacts having a contact surface positioned above the horizontal surface. The base station also includes a platform that is connectable to the docking structure. The platform includes a raised rear surface having a front portion and a rear portion, the rear portion configured to be substantially co-planar with the horizontal surface of the docking structure when the platform is connected to the docking structure. The platform also includes a first fluid management area being defined by a first sloping surface and a second sloping surface of the platform, the first sloping surface tapering from a forward portion of the platform, and the second sloping surface tapering from the raised rear surface.

In some implementations, the first fluid management area includes a fluid collection area proximate to the second sloping surface.

In some implementations, the at least two electrical charging contacts are positioned such that a highest point of each contact surface is between 4 and 8 mm above the horizontal surface.

In some implementations, the platform includes a plurality of raised surface features configured to support an underside portion of the mobile cleaning robot. In some cases, at least some of the plurality of raised surface features are located in the first fluid management area and forward to the fluid collection area.

In some implementations, the docking structure comprises a second fluid management area located below the electrical charging contacts, the second fluid management area comprising a fluid collection tray. In some cases, the fluid collection tray comprises a plurality of fluid collecting compartments. In some cases, the fluid collection tray holds between 0 and 100 mL of fluid.

In some implementations, the first fluid management area is further defined by a left sloping surface and a right sloping surface.

In some implementations, the first sloping surface has a sloping angle of between 5 and 15 degrees and wherein the second sloping surface has a sloping angle of between 5 and 15 degrees.

In some implementations, the first fluid management area is sloped downward toward the second sloping surface at an angle of between 0.5 and 2 degrees.

In some implementations, the first fluid management area holds between 0 and 100 mL of fluid.

In some implementations, the first sloping surface is inbound from a front edge of the platform.

In another aspect, a method of docking a mobile cleaning robot includes sensing a presence of a base station with the mobile cleaning robot, the mobile cleaning robot comprising a wet cleaning pad. The method also includes approaching the base station with the mobile cleaning robot and upon reaching a threshold distance from the base station, turning the mobile cleaning robot such that a rear of the mobile cleaning robot is presented to the base station. The method also includes reversing the mobile cleaning robot onto the base station. The method also includes contacting at least two charging contacts on the mobile cleaning robot with at least two corresponding electrical charging contacts on the base station, the electrical charging contacts on the base station each having a contact surface being positioned above a horizontal surface of the base station.

In some implementations, the method further includes charging a battery of the mobile cleaning robot as the robot sits on the base station. In some cases, the method further includes detecting that the battery of the mobile cleaning robot has completed charging. In some cases, the method further includes driving the mobile cleaning robot forward off of the base station.

In some implementations, the base station includes a plurality of raised surface features, wherein the raised surface features guide the robot to a charging position, and wherein in the charging position the at least two charging contacts on the mobile cleaning robot contact at least two corresponding electrical charging contacts on the base station.

In some implementations, the base station includes a plurality of raised surface features, wherein an arrangement of the raised surface features guides the robot to a charging position, and wherein in the charging position the at least two charging contacts on the mobile cleaning robot contact at least two corresponding electrical charging contacts on the base station.

In some implementations, the base station includes at least two bumpers, and wherein the bumpers guide the robot to a charging position, wherein in the charging position the at least two charging contacts on the mobile cleaning robot contact at least two corresponding electrical charging contacts on the base station. In some cases, the method further includes, in response to contacting at least one of the bumpers with a body of the mobile robot, aligning the mobile robot.

In some implementations, approaching the base station with the mobile cleaning robot comprises aligning the mobile cleaning robot with the base station using a positioning system on a front portion of the mobile cleaning robot.

In some implementations, the wet cleaning pad is disposed on an underside portion of the mobile cleaning robot forward to at least one wheel of the mobile cleaning robot.

Advantages of the foregoing may include, but are not limited to, those described below and herein elsewhere. With a docking station configured to support an underside of a mobile cleaning robot, adequate force can be applied to electrical charging contacts on the docking station to allow for charging. With a docking station configured to manage fluid, fluid that accumulates in a wet cleaning pad on a mobile cleaning robot drains from the robot and collects in specific areas on the docking station such that charging is not interrupted and the fluid can be easily disposed of. With a mobile robot able to enter the docking station backwards, the electrical charging contacts of the docking station do not come into contact with a wet cleaning pad of the mobile robot.

The details of one or more implementations of the subject matter described in this specification are set forth in the accompanying drawings and the description below. Other potential features, aspects, and advantages will become apparent from the description, the drawings, and the claims.

DETAILED DESCRIPTION

The present specification relates to systems and techniques for docking and charging a mobile cleaning robot that employs a wet cleaning pad. To avoid contacting the wet cleaning pad of the mobile cleaning robot with electrical charging contacts on a base station, the mobile cleaning robot enters the dock driving in a backward direction. Additionally, the base station provides electrical charging contacts for charging the mobile cleaning robot which must be contacted with a minimum amount of force for charging to occur. The base station provides support to portions of the mobile cleaning robot to position the mobile cleaning robot in a charging position that applies at least the minimum required force. Additionally, the base station manages fluid that may drip off of the mobile cleaning robot such that it does not spill off of the base station and may be easily discarded.

Figure 1:
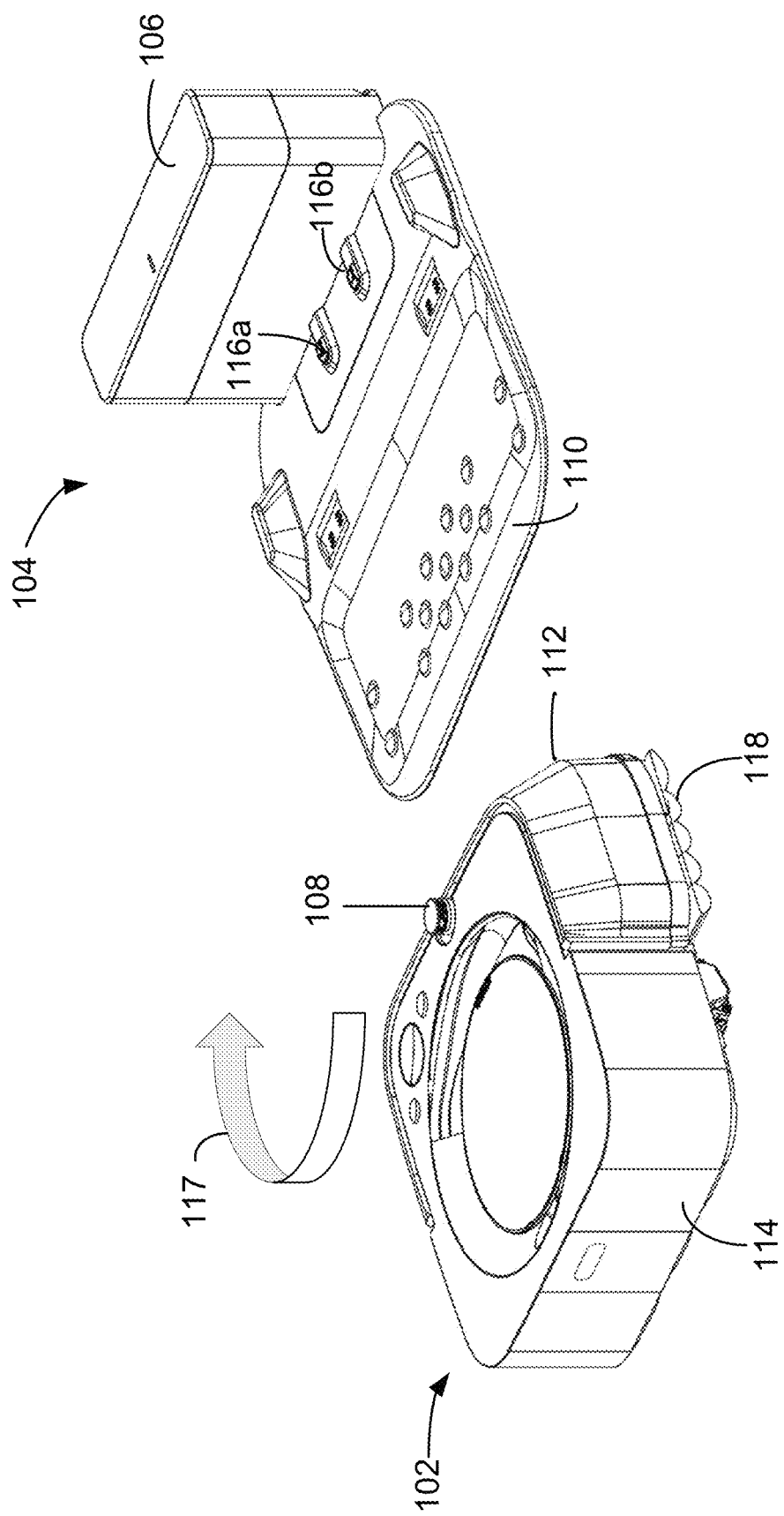
FIG. 1 is a view of a mobile cleaning robot approaching an exemplary base station.

Referring to FIG. 1, a mobile cleaning robot 102 approaches a base station 104 for docking (e.g., to charge one or more batteries contained in the robot). The mobile cleaning robot 102 is configured to communicate with a docking structure 106 of the base station 104. In some cases, the mobile cleaning robot 102 may include a sensor 108 on a forward portion 112 of the robot 102 for communicating with the docking structure 106. The docking structure 106 may include a wireless communication system configured to transmit and receive data with a communications module (not shown as the communications module is inside of a bumper of the robot 102) and the sensor 108 on the autonomous cleaning robot 102. The wireless communication system of the docking station 106 includes homing and alignment emitters operable to emit left and right homing signals (e.g., optical, infrared (IR), radiofrequency (RF), etc. signals) detectable by the communications module 108 of the mobile cleaning robot 102.

In some examples, the robot 102 may search for and detect the homing signals. Once the homing signals are detected, the robot 102 initiates an aligning and docking procedure to dock itself on a platform 110 of the base station 104. The aligning and docking procedure allows the mobile cleaning robot 102 to dock on the base station 104 without running a cleaning pad 118 of the mobile cleaning robot 102 over electrical charging contacts 116a and 116b of the base station 104. First, the robot 102 aligns itself with the base station 104 using the homing signals emitted by the base station 104 and presents a forward portion 112 of the robot 102 to the base station 104. The robot 102 then turns approximately 180° (as graphically represented by arrow 117) to present a rear portion 114 of the robot 102 to the base station 104. In some implementations, the robot 102 uses wheel tachometers, odometers, etc. to determine the distance travelled by the wheels and computes (e.g., using an internal controller), the position of the rear portion 114 of the robot 102 relative to the base station 104. In some implementations, the robot 102 uses a camera and feature identifier (e.g., software executed on board the robot) to identify features of the robot's environment to orient the robot 102 relative to the base station 104. In some implementations, the robot 102 uses a communications module on a rear portion 114 of the robot to align with the communications system of the docking structure 106. A communications module on the rear portion 114, in embodiments, includes sensors such as those described above in embodiments having sensors on the forward portion 112 of the robot 102.

Figure 2:
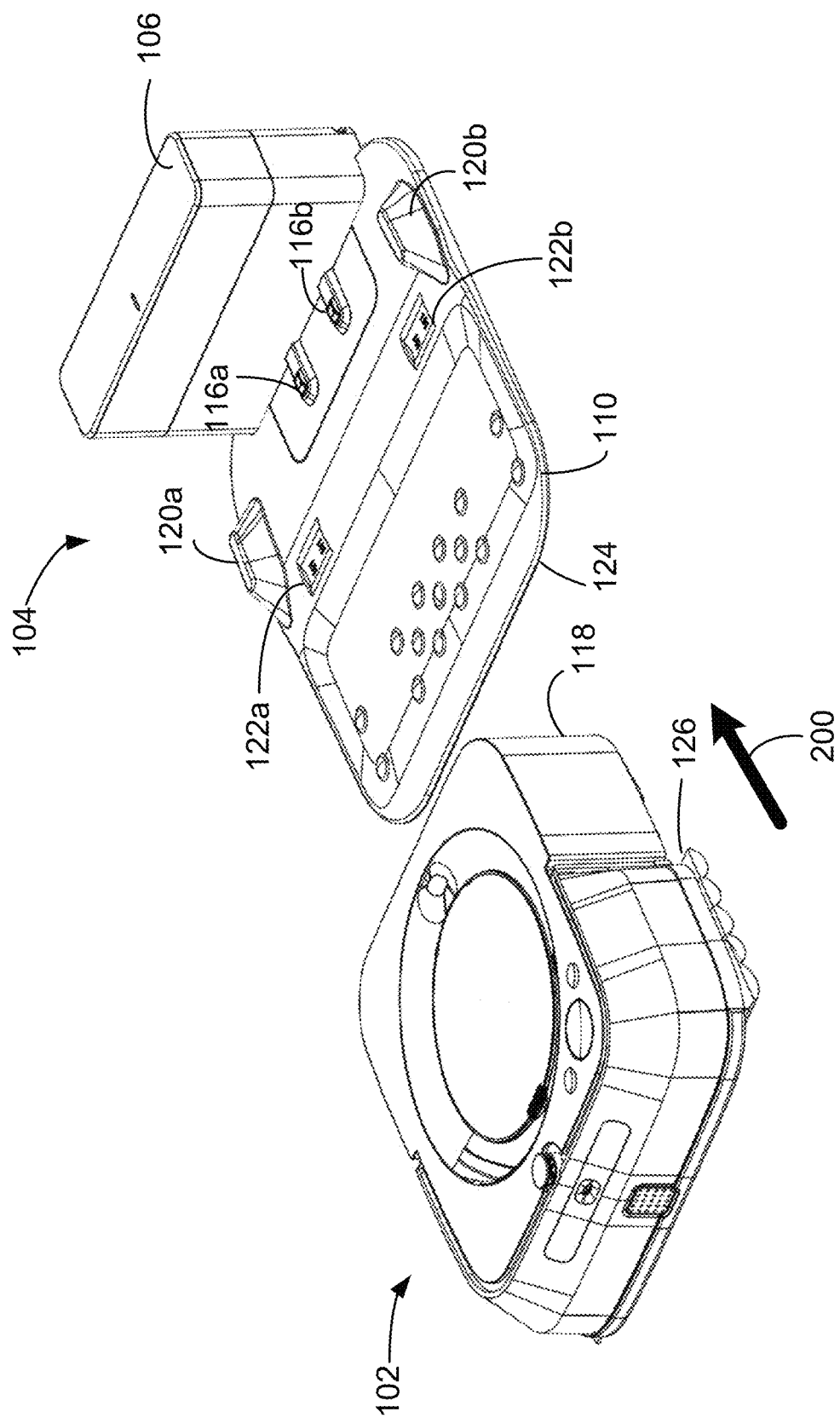
FIG. 2 is a view of the mobile cleaning robot backing into the base station of FIG. 1.

FIG. 2 is a view of the mobile cleaning robot 102 backing into the base station 104. Upon determining that the robot 102 is in a correct position for backing into the base station 104, the robot 102 begins driving backwards onto the platform 110 (as graphically represented by arrow 200). In some implementations where the mobile cleaning robot 102 includes a communications module on a rear portion 114 of the robot 102, the bumpers 120a and 120b are not required. The robot 102 is guided into a charging position by bumpers 120a and 120b. The bumpers 120a and 120b have sloping sides that may contact a body of the robot 102 as it moves across the platform 110. In the charging position, wheels of the mobile cleaning robot 102 are respectively positioned in wheel wells 122a and 122b of the platform 110 and charging contacts (hidden from view in the figure) on the mobile cleaning robot 102 contact electrical charging contacts 116a and 116b. Upon reaching a desired level of battery charge, the mobile cleaning robot 102 may drive forward and exit the base station 104.

Additionally, the platform 110 has a front edge 124 with a height that is configured to allow a rear edge 126 of the cleaning pad 118 to slide over the front edge 124 of the platform 110 without getting caught or folded as the mobile cleaning robot 102 traverses the platform 110. The height of the front edge 124 of the platform 110 is approximately between 0 mm and 4.5 mm (e.g., 0-2 mm, 2-3 mm, 3-4.5 mm, etc.). This height accommodates a robot with a low ground clearance between the bottom of the robot and the floor, for example a ground clearance of less than 10 mm (e.g. 1 mm, 2 mm, 3 mm, 4 mm, 5 mm, 6 mm, 7 mm, 8 mm, 9 mm). In embodiments, the ground clearance of the mobile cleaning robot 102 (e.g., the shortest distance from the bottom surface of the robot to the ground) is between 5 mm and 10 mm (e.g., 5 mm-10 mm, 6 mm-9 mm, 7 mm-8 mm). In embodiments, the ground clearance of the mobile cleaning robot 102 is 6 mm to the bottom of the robot and 7.5 mm between the contacts and the floor surface.

Figure 3:
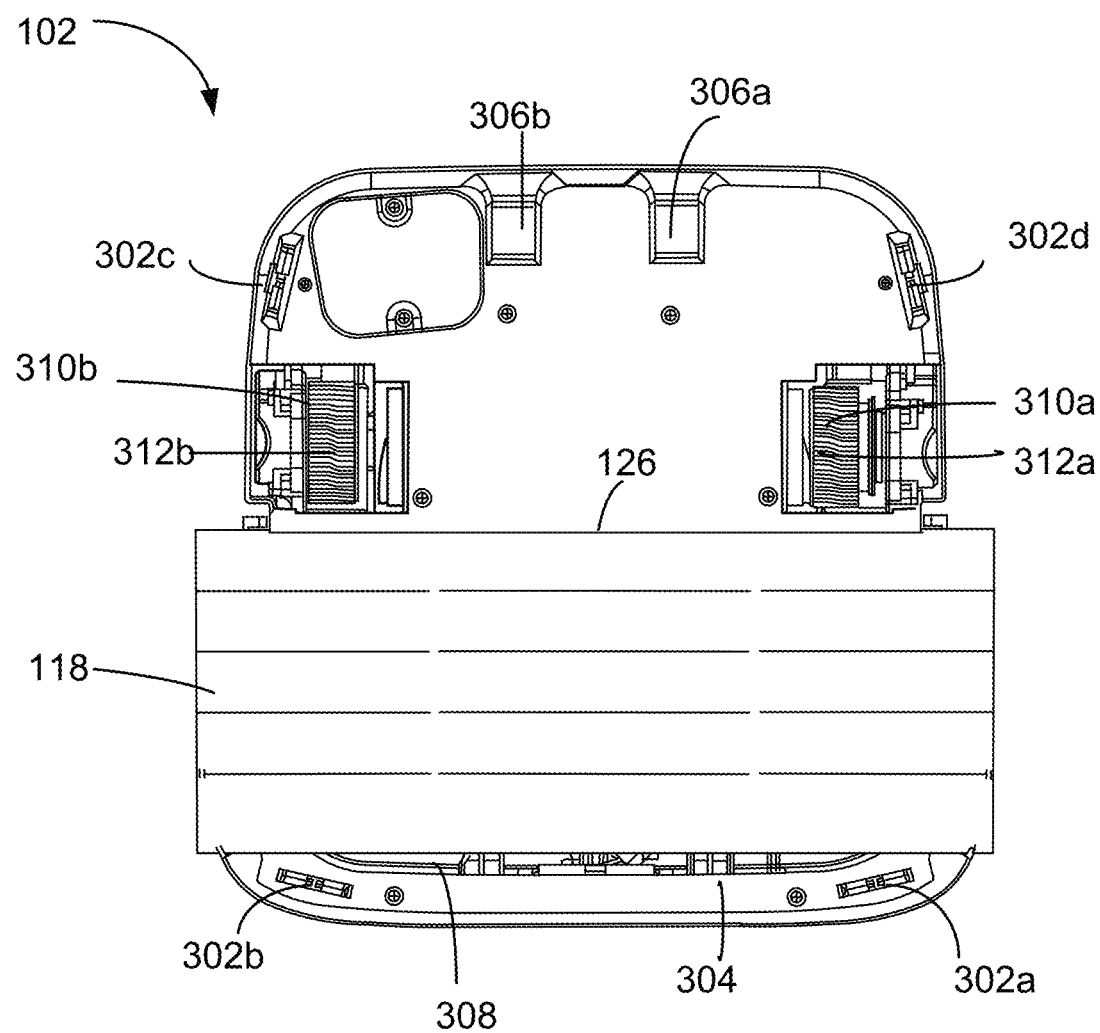
FIG. 3 is a bottom view of the mobile cleaning robot of FIG. 1.

FIG. 3 is a bottom view of the mobile cleaning robot 102 and illustrates the cleaning pad 118 being carried on an underside portion 304 of the robot 102. The cleaning pad 118 is configured to hold liquid and to be used during a mopping cleaning mission. In some implementations, the cleaning pad 118 may be a dry cleaning pad that is configured to be used during a sweeping or dusting cleaning mission. The mobile cleaning robot 102 also includes cliff sensors 302a-d for providing data to a controller of the mobile cleaning robot 102 for obstacle detection and navigation of the mobile cleaning robot 102 during a cleaning mission to prevent the robot 102 from attempting to traverse a significant change in flooring height.

The mobile cleaning robot 102 also includes electrical charging contacts 306a and 306b. The electrical charging contacts 306a and 306b are generally flat, rectangular in shape, and configured to contact the electrical charging contacts 116a and 116b of the base station, respectively. In some implementations, the electrical charging contacts 306a and 306b may include a nickel material or other plating material. Including a nickel material helps to prevent rusting. Including a silver or a gold material may help improve electrical contact, however these materials are expensive to include in electrical charging contacts with large areas. The mobile cleaning robot may be placed, by a user, on the base station 106 after the user has removed the cleaning pad 118. In such cases, a debris pushing structure 308 of the mobile cleaning robot 102 is exposed and is supported by the platform 110. The mobile cleaning robot 102 includes two wheels 310a and 310b for driving the mobile cleaning robot 102. The wheels 310a and 310b include surface features 312a and 312b (e.g., a tread pattern, grooves) to provide traction to the mobile cleaning robot 102 as it moves across a floor surface, for example, a wet floor surface or a smooth, polished floor surface.

Figure 4A:
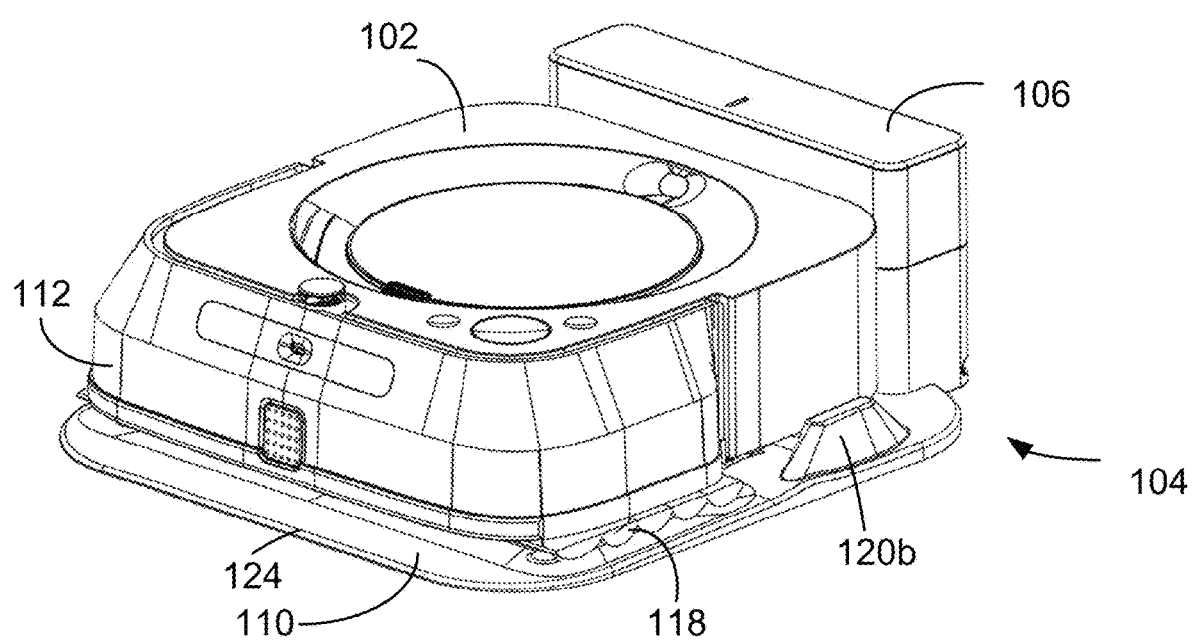
FIG. 4A is a perspective view of the mobile cleaning robot positioned on the base station of FIG. 1.

FIG. 4A is a perspective view of the mobile cleaning robot 102 positioned on the base station 104. After the platform 110 is traversed during a docking procedure, the mobile cleaning robot 102 is supported by the base station 104 in a charging position. In the charging position, wheels 310a and 310b of the mobile cleaning robot 102 are respectively positioned in wheel wells 122a and 122b of the platform 110. Electrical charging contacts 306a and 306b on the mobile cleaning robot 102 contact electrical charging contacts 116a and 116b of the base station, respectively. In the charging position, a minimum amount downward force is required to create contact sufficient for electrically connecting and charging the mobile cleaning robot 102. In some implementations, approximately one pound of downward force allows for charging. The downward force can be created through a variety of techniques, including gravity, magnetics, and mechanical springs alone or in combination with one another. In one implementation, gravity provides between approximately 0.1 and 1 pounds (e.g., 0.1 to 0.4 pounds, 0.4 to 0.7 pounds, 0.7 to 1.0 pounds) of downward force at the charging contacts 116a and 116b. The mobile cleaning robot 102 weighs between approximately 1 and 5 pounds (e.g., 1 to 2 pounds, 2 to 3 pounds, 3 to 5 pounds). In implementations, the mobile cleaning robot 102 includes an internal storage reservoir (not shown) for holding fluid and a dispenser, such as a spray nozzle, for ejecting fluid onto a floor surface for cleaning. As cleaning fluid is applied to the floor surface, the weight of the robot 102 decreases. The electrical charging contacts 116a and 116b of the base station accommodate this shifting range of robot weights.

Figure 4B:
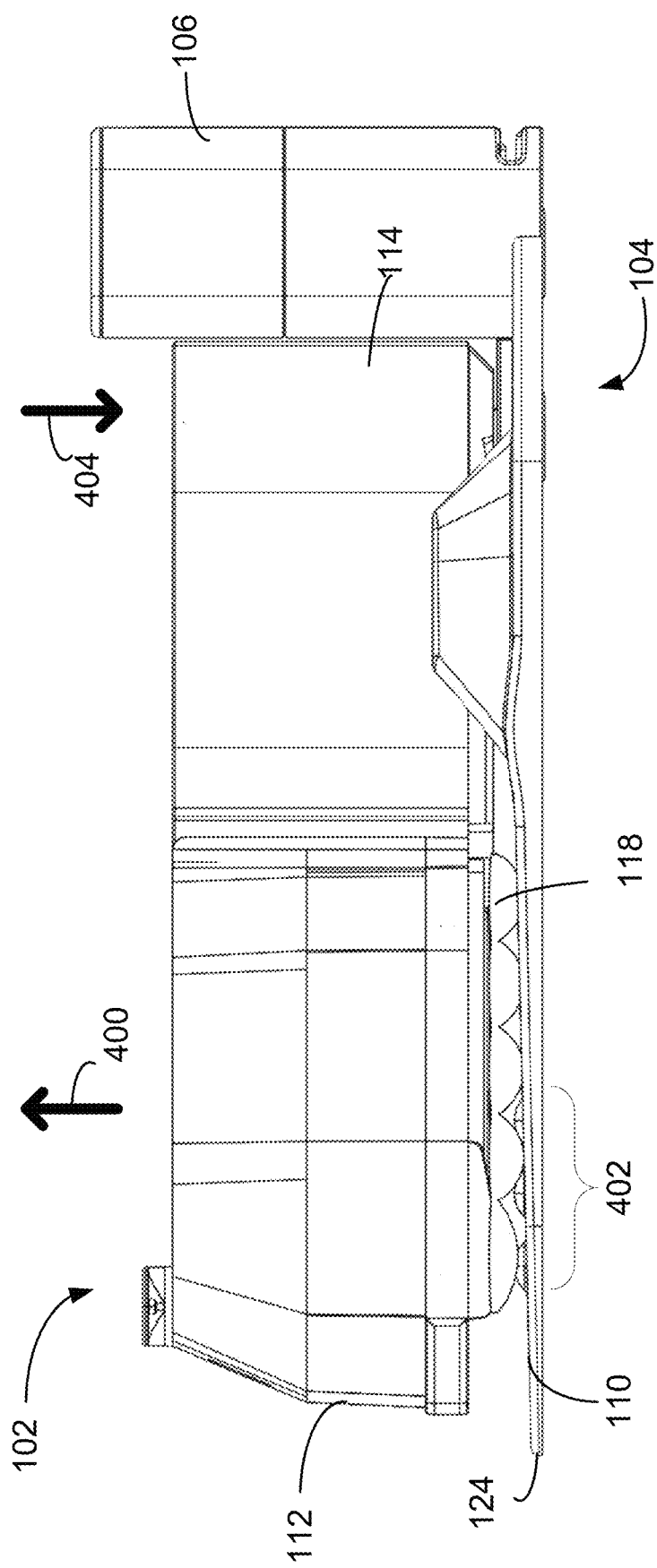
FIG. 4B is a side view of the mobile cleaning robot positioned on the base station of FIG. 1.

FIG. 4B is a side view of the mobile cleaning robot 102 positioned on the base station 104. The cleaning pad 118 is supported by a plurality of raised surface features 402 of the platform 110. The support of the underside portion 304 (either the pad 118 or the debris pushing structure 308) of the mobile cleaning robot by the platform 110 helps to tilt the mobile cleaning robot 102 into the charging position. The forward portion 112 of the mobile cleaning robot 102 is pushed upward (as graphically represented by arrow 400) by a plurality of raised surface features 402 of the platform 110, which pivots the robot 102 and causes the rear portion 114 of the robot to be pushed downward (as graphically represented by arrow 404). The mobile cleaning robot 102 may be placed on the base station 106 after the cleaning pad 118 has been removed. In such cases, a debris pushing structure 308 of the mobile cleaning robot 102 is exposed and is supported by the platform 110. Because the debris pushing structure 308 can be supported by the platform 110 in place of the pad 118, the mobile cleaning robot can charge regardless of whether the mobile cleaning robot 102 has a cleaning pad 118 attached or not.

Figure 5A:
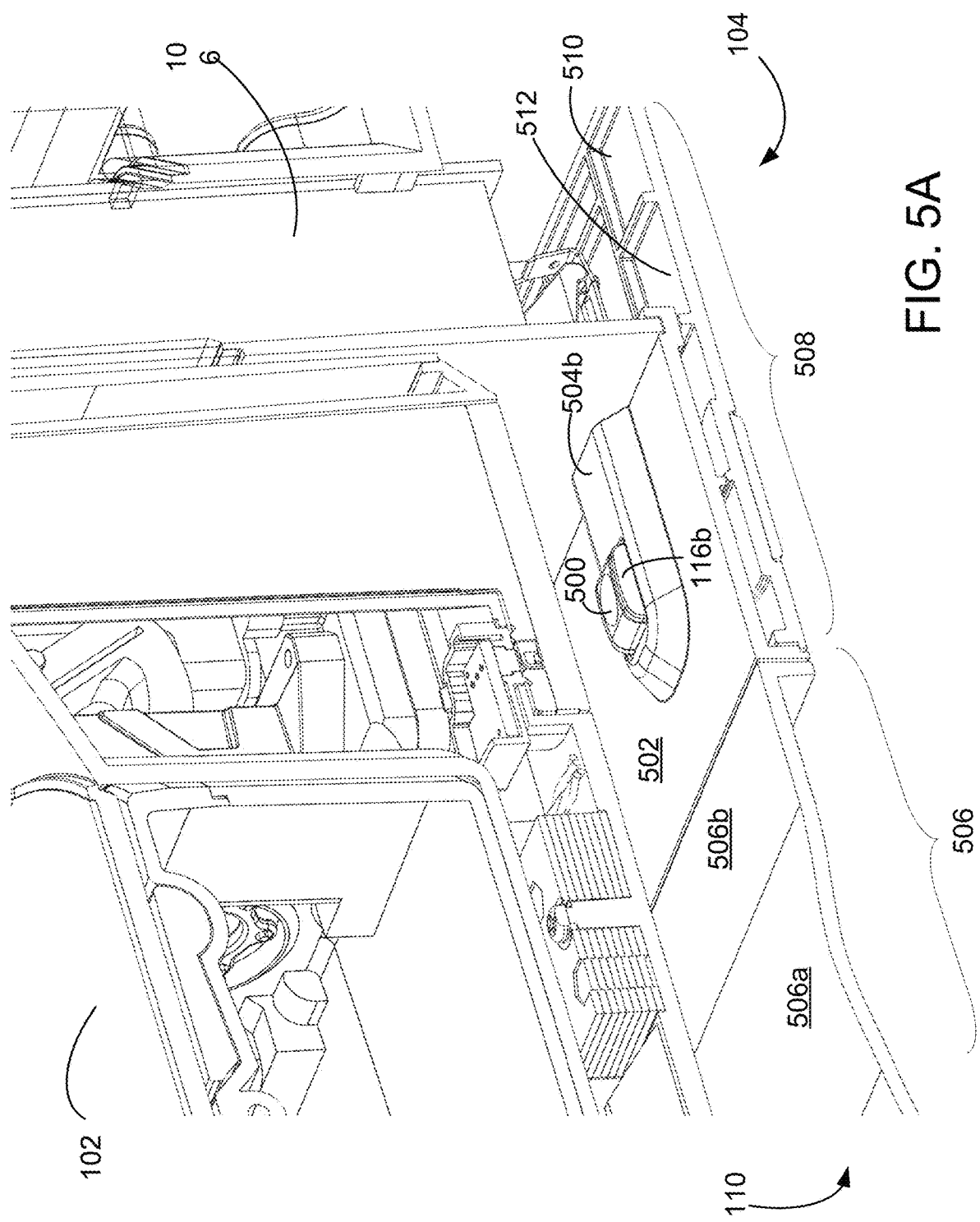
FIG. 5A is a cutaway view of the mobile cleaning robot positioned on the base station of FIG. 1.

FIG. 5A is a cutaway view of the mobile cleaning robot 102 positioned on the base station 104. In some implementations, the mobile cleaning robot 102 docks at the end of a cleaning mission. Electrical contact 116b has a domed shape and a contact surface 500 for contacting the electrical charging contact 306b of the mobile cleaning robot 102. The contact surface 500 of the electrical charging contact 116b is positioned above a horizontal surface 502 of the docking structure 106. As such, liquid that collects on the horizontal surface 502 is less likely to come in contact with the electrical charging contact 116b. The pad 118 may be made of a fibrous or cloth material that is configured to hold liquid. The outside of the pad 118 may be moist and, in some instances, liquid may drip from the pad 118.

The horizontal surface 502 is co-planar with a rear portion 506a of a raised rear surface 506 of the platform 110. In some implementations, the horizontal surface 502 and raised rear surface 506 may not be co-planar with one another. The electrical charging contact 116b is surrounded by a finger-like projection 504b with sloped sides. Underneath the electrical charging contacts 116a and 116b, the docking structure includes a second fluid management area 508 to collect liquid. The second fluid management area 508 is a fluid collection tray that includes multiple compartments 510, 512 that collect liquid. The second fluid management area can hold fluid up to a volume of between approximately 0 and 100 mL (e.g., 0-25 mL, 25-50 mL, 50-75 mL, 75-100 mL). As liquid drips down from the horizontal surface, between a gap between the electrical charging contact 116b and the finger-like projections 504b, the liquid collects in the compartments 510, 512.

Figure 5B:
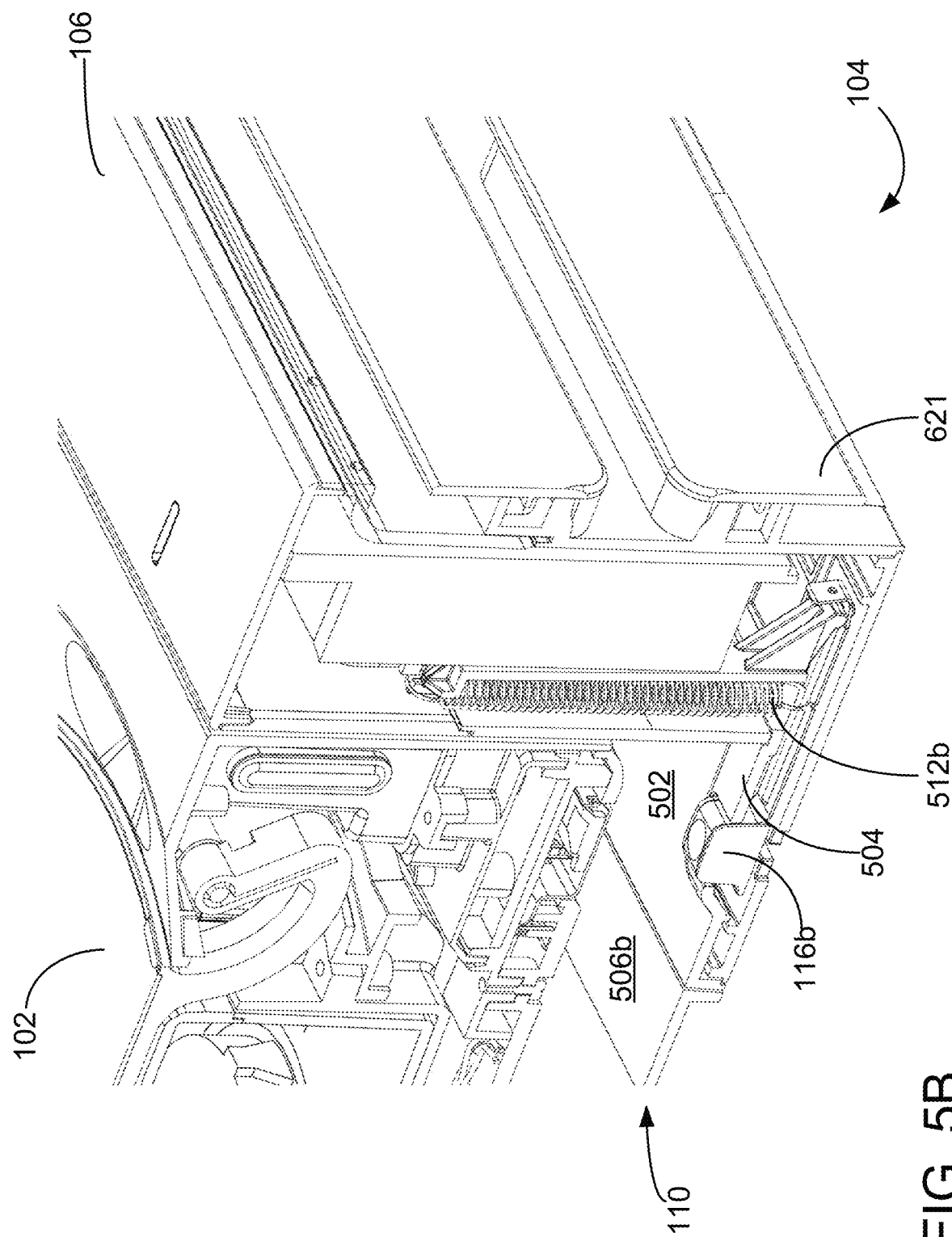
FIG. 5B is another cutaway view of a mobile cleaning robot positioned on the base station of FIG. 1.

FIG. 5B is another cutaway view of a mobile cleaning robot 102 positioned on the base station 104. An extension spring 512b is connected to the electrical charging contact 116b and provides at least a portion of a minimum downward force required for charging the mobile cleaning robot 102. In some implementations, the extension spring 512b provides between approximately 0.2 and 1 pounds of force (e.g., 0.2 to 0.5 pounds, 0.5 to 0.8 pounds, and 0.8 to 1.0 pounds). As the charging contact 306b on the mobile cleaning robot 102 (not shown in the figure) contacts the electrical charging contact 116b of the docking structure 106, the electrical charging contact 116b is displaced in a downward direction and the extension spring 512b is extended. When the electrical charging contact 116b is not in contact with the electrical charging contact 306b on the mobile cleaning robot 102, the extension spring 512b is in a less extended position, but is still in tension as the extension spring 512b pulls the electrical charging contact 116b up to a stop point. The extension spring 512b has a low spring constant such that a small increase or decrease in length of the spring from the movement of the electrical charging contact 116b results in a small change in contact force.

Figure 6A:
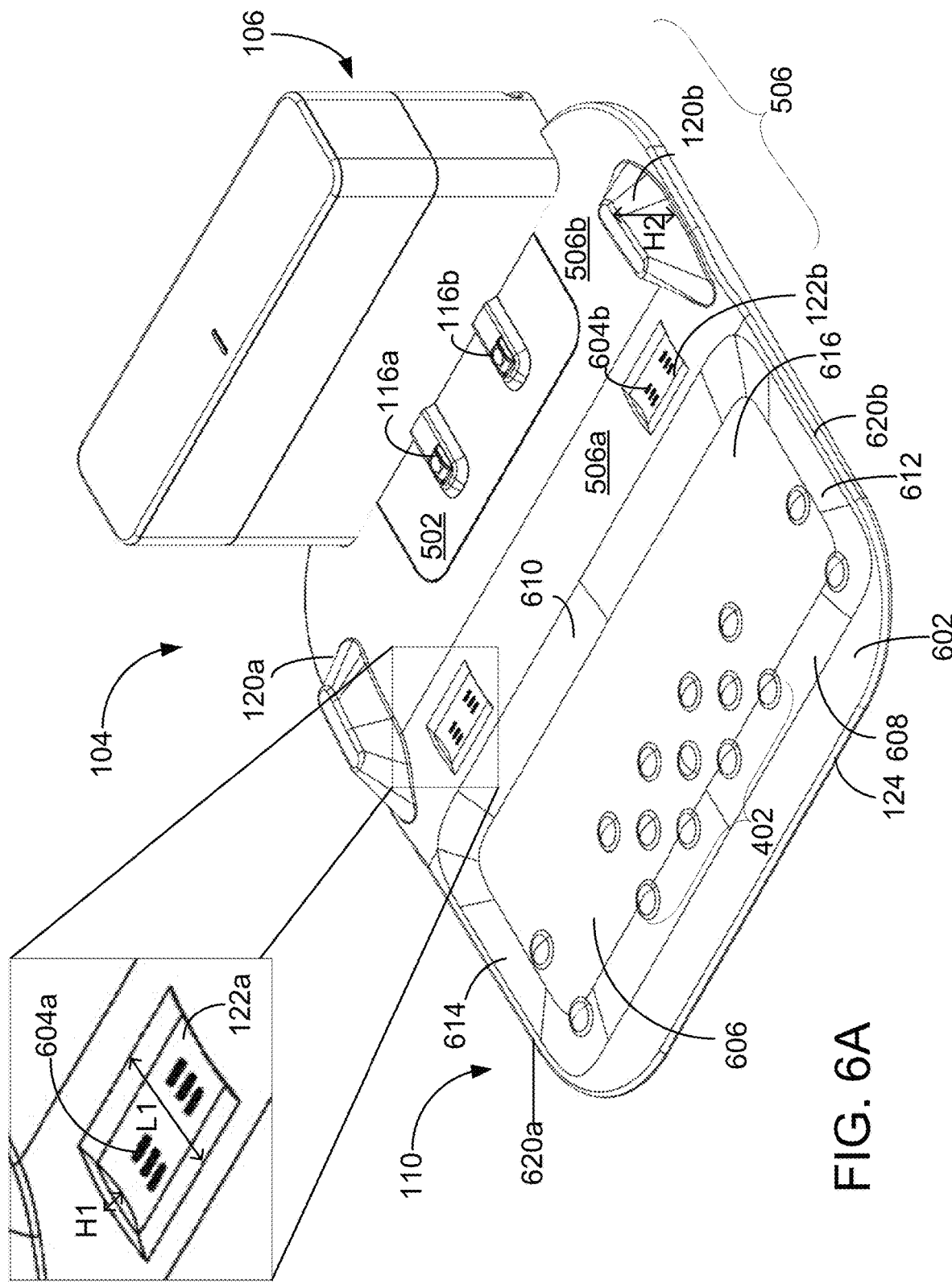
FIG. 6A is a perspective view of a platform of the base station being connected to a docking structure of the base station of FIG. 1.

FIG. 6A is a perspective view of a platform 110 of the base station 104 being connected to a docking structure 106 of the base station 104. The platform 110 has a forward portion 602 and a raised rear surface 506. The raised rear surface 506 has a front portion 506a and a rear portion 506b. Two wheel wells 122a and 122b are disposed in the front portion 506a of the raised rear surface 506. A close up of wheel well 122a is showed in an inset in FIG. 6A. Wheel well 122a has a curved surface with a maximum height H1 at the lowest point of the curve being between approximately 4 and 8 mm (e.g., 4-5 mm, 5-6 mm, 6-7 mm, 7-8 mm) below the front portion 506a of the raised rear surface 506. The depth of the wheel wells 122a and 122b is limited by the ground clearance of the mobile cleaning robot 102. The length L1 of the wheel well 122a is between approximately 20 and 30 mm (e.g., 20-25 mm, 25-30 mm) and is established by the depth and diameter of the wheel well curve. The curvature of the wheel well 122a is based on a circle that is between approximately 5 and 20 percent (e.g., 5-10 percent, 10-15 percent, 15-50 percent) larger than the wheel of the mobile cleaning robot 102. The wheel wells 122a and 122b have surface features 604a and 604b disposed on the curved surfaces of the wheel wells 122a and 122b, respectively. The surface features 604a and 604b may include raised tread that complement grooves on wheels 310a and 310b of the mobile cleaning robot to provide increased traction to the mobile robot when exiting the wheel wells 122a and 122b.

The platform 110 also includes a first fluid management area 606 which is defined by a first sloping surface 608 and a second sloping surface 610. The first sloping surface 608 tapers from the forward portion 602 of the platform 110. The second sloping surface 610 tapers from the raised rear surface 506 of the platform. The fluid management area 606 slopes downward toward the raised rear surface 506 of the platform. The first sloping surface 608 has a sloping angle of between 5 and 15 degrees (e.g., 5-10 degrees, 10-15 degrees) and the second sloping surface 610 has a sloping angle of between 5 and 15 degrees (e.g., 5-10 degrees, 10-15 degrees). The first fluid management area 606 has a sloping angle of between 0.5 and 2 degrees (e.g., 0.5 to 1 degree, 1 to 1.5 degrees, 1.5 to 2 degrees).

The fluid management area 606 is also defined by a right sloping surface 612 and a left sloping surface 614. The right sloping surface 612 tapers from the right outer portion 620b of the platform 110 and the left sloping surface 614 tapers from the left outer portion 620a of the platform 110. The right outer portion 620a and the left outer portion 620b are continuous surfaces from the forward portion 602 of the platform and slope upward from the front edge 124 of the platform 110 toward the raised rear surface 506 at a sloping angle of between 0.5 and 2 degrees (e.g., 0.5 to 1 degree, 1 to 1.5 degrees, 1.5 to 2 degrees). The first fluid management area 606 includes a fluid collection area 616 proximate to the second sloping surface 610. Fluid will collect in the fluid collection area 616 as fluid flows down the sloping surfaces 608, 610, 612, and 614 and the surface of the first fluid management area 606. The fluid collection area 616 can hold fluid up to a volume of between approximately 0 and 100 mL (e.g., 0-25 mL, 25-50 mL, 50-75 mL, 75-100 mL).

The first fluid management area 606 also includes a plurality of raised surface features 402. The raised surface features 402 are configured to support an underside portion of the mobile cleaning robot 102 when the mobile cleaning robot 102 is in a charging position on the base station 104. The raised surface features 402 have a domed shape and a height of between approximately 2 and 6 mm (e.g., 2-3 mm, 3-4 mm, 4-5 mm, 5-6 mm). The height of the raised surface features 402 is selected such that the raised surface features are tall enough to support and tilt the forward portion 112 of the mobile cleaning robot 102 into a charging position, but short enough that the mobile cleaning robot 102 can clear them with minimal ground clearance. In embodiments, the ground clearance of the mobile cleaning robot 102 (e.g., the shortest distance from the bottom surface of the robot to the ground) is between 5 mm and 10 mm (e.g., 5 mm-10 mm, 6 mm-9 mm, 7 mm-8 mm) At least some of the raised surface features 402 are located in the first fluid management area 606 forward to the fluid collection area 616. The raised surface features 402 are laid out in a pattern configured to allow the wheels of the mobile cleaning robot 102 to navigate between the raised surface features 402 in the pattern, without traversing over the raised surface features 402. The pattern of raised surface features 402 may help to guide the wheels 310a and 310b of the mobile cleaning robot toward the wheel wells 122a and 122b, respectively.

The height of the raised surface features 402, the height H1 of the wheel wells 122a and 122b, and the height of the electrical charging contacts 116a and 116b are selected such that when the mobile cleaning robot 102 makes contact with the platform at these locations (wheel 310a in wheel well 122a, wheel 310b in wheel well 122b, electrical charging contact 306a touching electrical charging contact 116a, electrical charging contact 306b touching electrical charging contact 116b, and the pad or an underside portion of the mobile cleaning robot 102 being supported by the raised surface features 402), the mobile cleaning robot 102 is positioned such that the minimum downward force is produced at the electrical charging contacts 116a and 116b.

The platform 110 also includes bumpers 120a and 120b. The bumpers 120a and 120b have sloping sides that may contact a body of the robot 102 as it traverses the platform 110. The bumpers 120a and 120b have a height H2 of approximately between 18 and 50 mm (e.g., 18-30 mm, 30-40 mm, 40-50 mm) above the front portion 506a of the raised rear surface 506. The height of the bumpers 120a and 120b is configured such that, if the mobile cleaning robot 102 is off track and mounts one of the bumpers 120a and 120b as the robot 102 attempts to dock on the base station 104, the electrical charging contacts 306a and 306b on the mobile cleaning robot 102 cannot make contact with the electrical charging contacts 116a and 116b on of the docking structure 106.

The footprint of each of the bumpers 120a and 120b has a rounded front shape and an angled inner edge to guide the mobile cleaning robot 102 into the charging position. When looking down at the platform 110 from above, the inside bottom edges of the bumpers 120a and 120b angle inward toward one another such that there is less space between the inside bottom edges of the bumpers 120a and 120b as the bumpers 120a and 120b extend backward across the raised rear surface 506. The bumpers 120a and 120b are positioned on the raised rear surface 506 of the platform 110 such that the bumpers 120a and 120b do not extend forward past the wheel wells 122a and 122b. In some implementations, the bumpers 120a and 120b may extend forward of the wheel wells 122a and 122b, however, the bumpers 120a and 120b should not extend forward so much that they interfere with the mobility of the robot. In some implementations, the bumpers 120a and 120b may extend further backward and inward toward the docking structure 106 such that the bumpers 120a and 120b form a U-shape along the back of the base station 104.

Figure 6B:
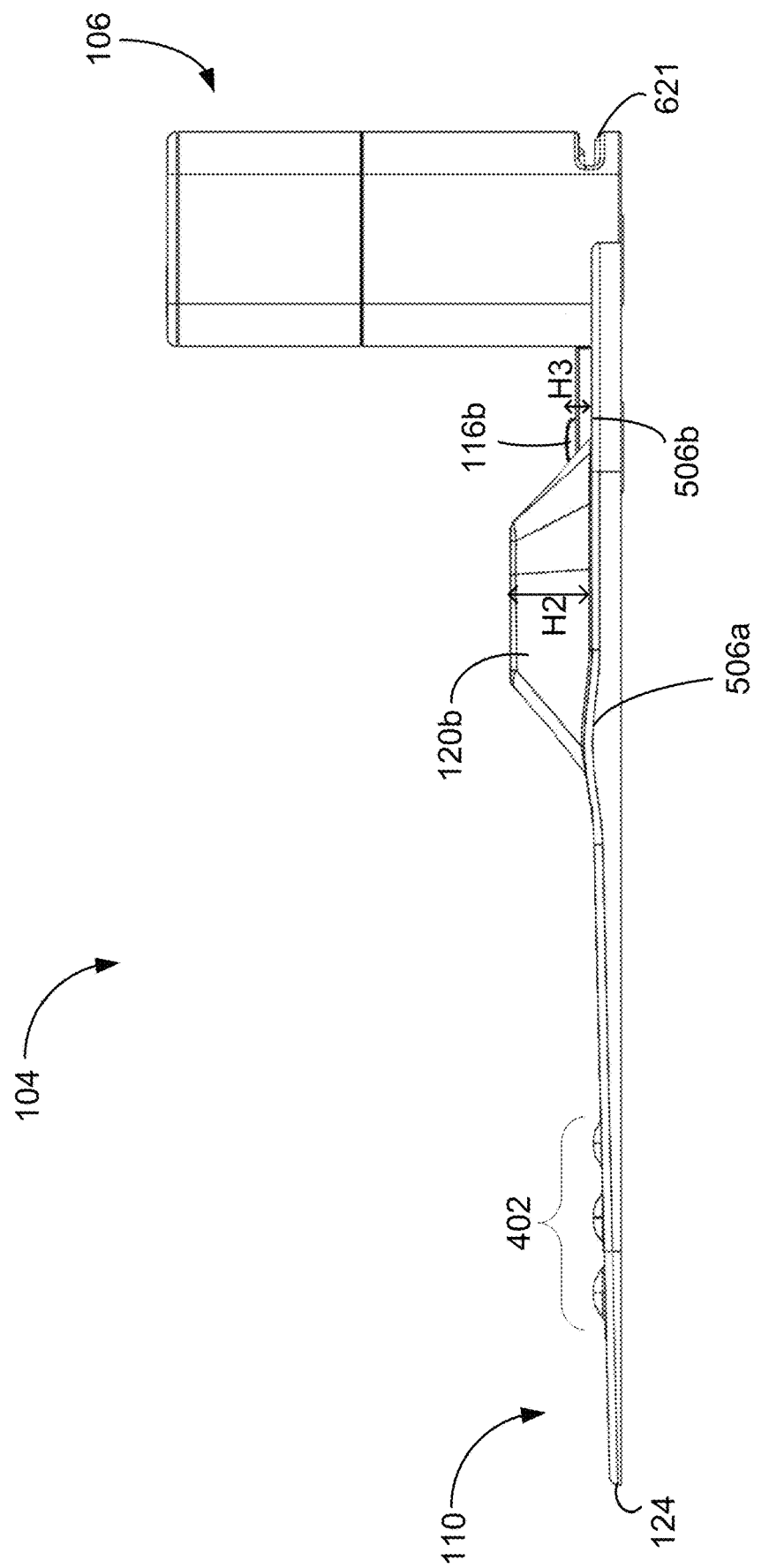
FIG. 6B is a side view of the base station of FIG. 1.

FIG. 6B is a side view of the base station 104. The left and right outer surfaces 620a and 620b of the platform 110 generally slope upward from the front edge 124 of the platform 110 to the forward portion 506a of the raised rear surface 506. This general upward slope of the outer surfaces 620a and 620b is the opposite of the downward slope of the first fluid management area 606 toward the raised rear surface 506. The raised surface features 402 have a height taller than the left and right outer surfaces 620a and 620b. The bumpers 120a and 120b are positioned on the raised rear surface 506 and have a height H2 of approximately between 18 and 50 mm (e.g., 18-30 mm, 30-40 mm, 40-50 mm) above the front portion 506a of the raised rear surface 506. The charging contacts 116a and 116b are positioned at a height H3 above the rear portion 506b of the raised rear surface 506 which is between approximately 4 and 8 mm (e.g., 4 to 6 mm, 6 to 8 mm). Height H3 is established by the distance from a floor surface to the contacts in the robot. A wire management feature 621 is located on the back of the docking station 106 for keeping a power cord for the base station tidy.

Figure 6C:
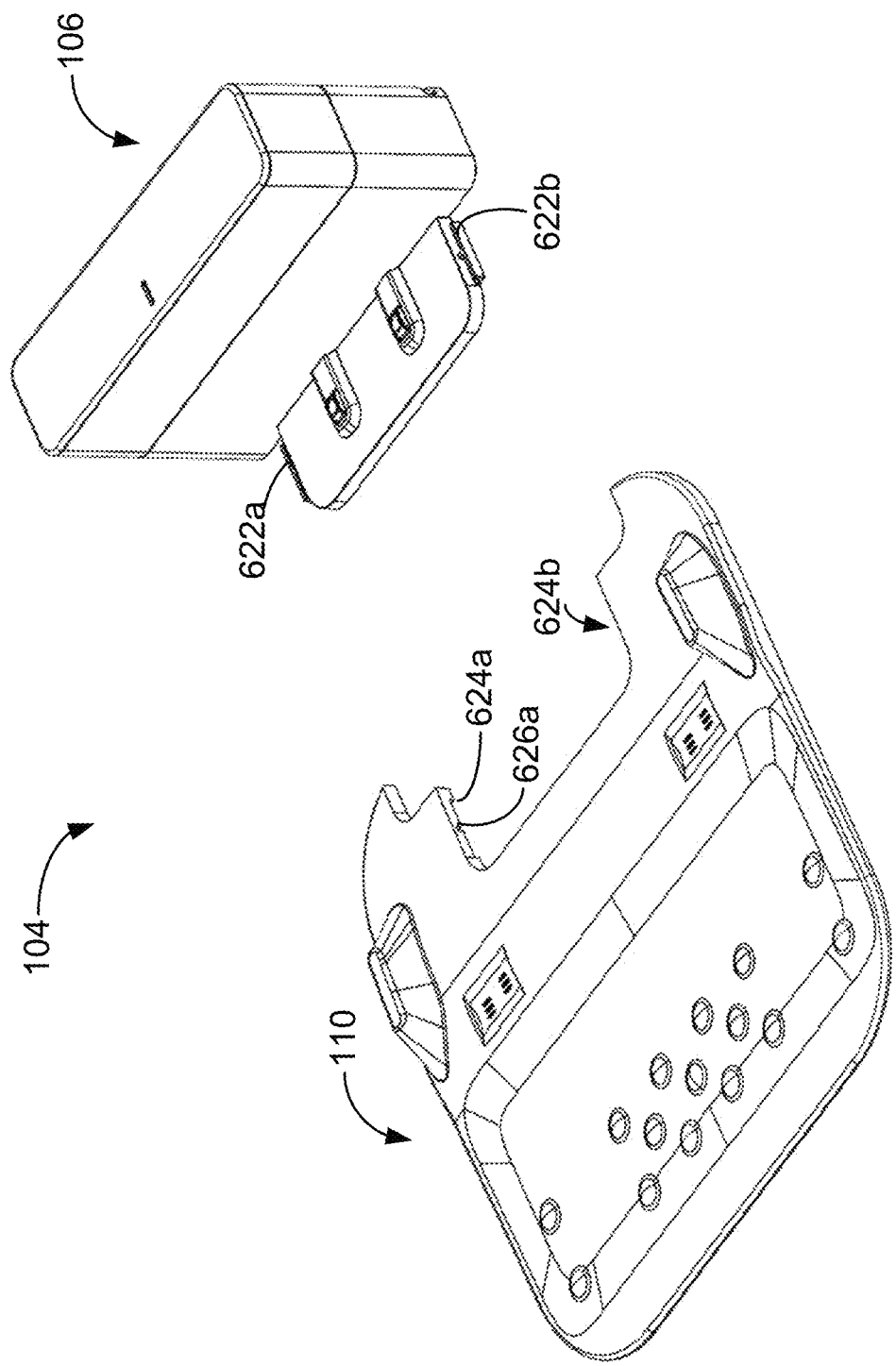
FIG. 6C is a perspective view of the platform of the base station being separated from the docking structure of the base station of FIG. 1.

FIG. 6C is a perspective view of the platform 110 of the base station 104 being separated from the docking structure 160 of the base station 104. The platform 110 and the docking structure 106 are connectable via a locking feature. The locking feature includes two connectors 622a and 622b that fit into two sockets 624a and 624b, respectively. The connector 622a is T-shaped and the corresponding socket 624a has a notch 626a to fit a stem of the T-shaped connector 622a.

The platform 110 and the docking structure 106 must be lifted vertically relative to one another in order to disconnect the connectors 622a and 622b from their corresponding sockets 624a and 624b. As such, the platform 110 cannot be slid horizontally to separate the platform 110 from the docking structure 106. This feature is important because the robot, as it moves across the platform 110, cannot substantially move or unseat the platform 110 from the docking structure 106. Because proper contact for charging the mobile cleaning robot 102 is dependent on proper positioning of the mobile cleaning robot 102 on the platform 110 (e.g., support by the raised surface features 402, the wheel wells 122a and 122b), relative horizontal movement of the platform, which includes the support elements, and the docking structure, which includes the electrical charging contacts 116a and 116b, could disrupt the ability of the mobile cleaning robot 102 to charge on the base station 104. The vertical detachment geometry of the platform 110 from the docking structure 106 also allows for a user to pick up the platform 110 with minimal horizontal sloshing of fluid that may have collected on the platform 110. The separability of the platform 110 and the docking structure 106 allows for washing the platform 110 independently from the docking structure 106.

Figure 7:
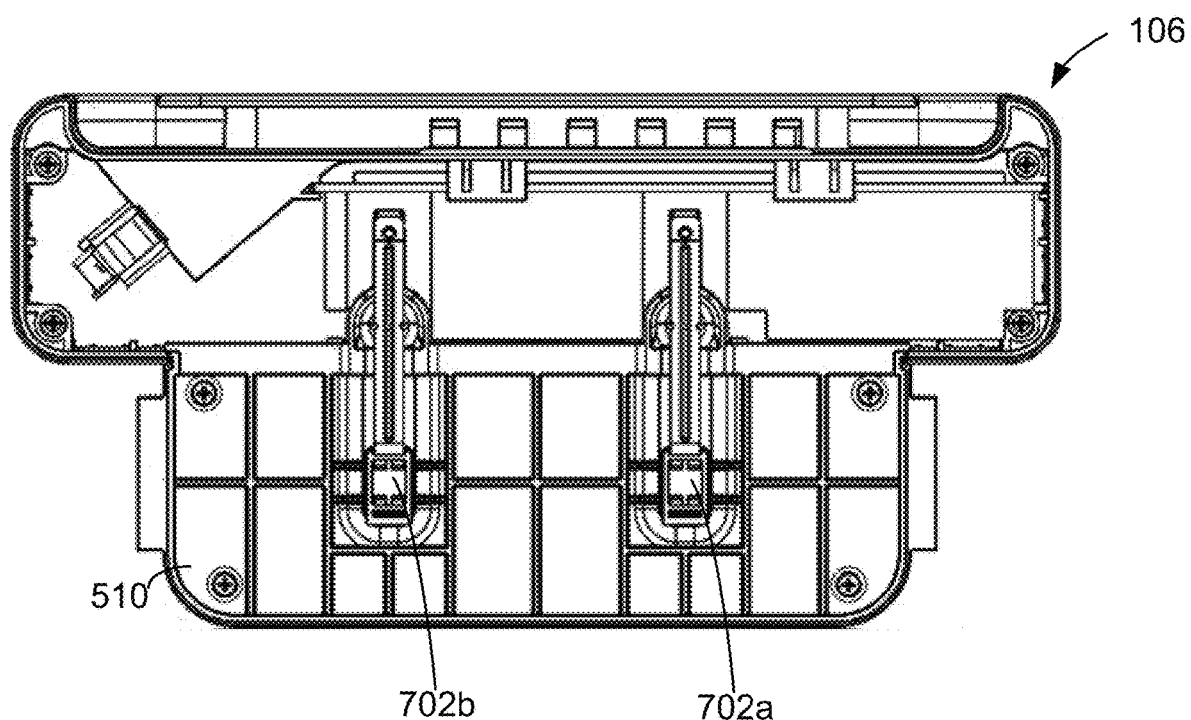
FIG. 7 is a bottom view of the docking structure of the base station of FIG. 1.

FIG. 7 is a bottom view of the docking structure 106 of the base station 104. The docking structure has gaps 702a and 702b underneath the electrical charging contacts 116a and 116b to allow fluid to drain should any fluid fall between the electrical charging contacts 116a and 116b and the horizontal surface 502. The compartments 510 of the second fluid management area 508 are positioned underneath the horizontal surface 502 to catch fluid and protect the underlying floor surface.

Figure 8:
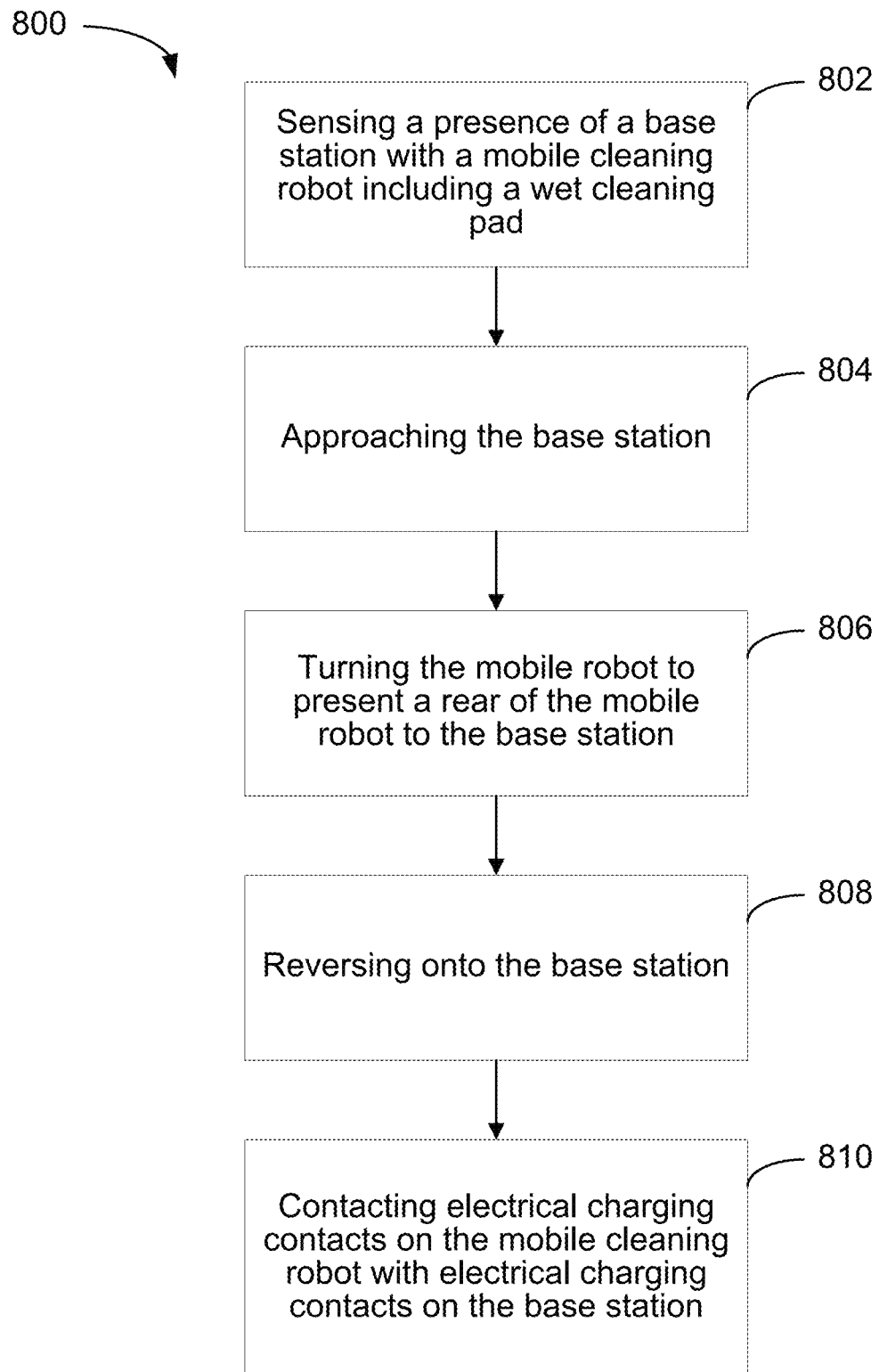
FIG. 8 is a flowchart of operations for docking the mobile cleaning robot on the base station of FIG. 1.

FIG. 8 is a flowchart 800 of operations for docking the mobile cleaning robot on the base station. The method includes sensing (802) a presence of a base station with the mobile cleaning robot, the mobile cleaning robot comprising a wet cleaning pad. The method also includes approaching (804) the base station with the mobile cleaning robot and upon reaching a threshold distance from the base station, turning (806) the mobile cleaning robot such that a rear of the mobile cleaning robot is presented to the base station. The method also includes reversing (808) the mobile cleaning robot onto the base station and contacting (810) at least two charging contacts on the mobile cleaning robot with at least two corresponding electrical charging contacts on the base station, the electrical charging contacts on the base station each having a contact surface being positioned above a horizontal surface of the base station.

Operations associated with implementing all or part of the navigation techniques described herein can be performed by one or more programmable processors executing one or more computer programs to perform the functions described herein. For example, the robot's controller may include processors programmed with computer programs for executing functions such as transmitting signals, computing a pose of the robot, or interpreting signals. A computer program can be written in any form of programming language, including compiled or interpreted languages, and it can be deployed in any form, including as a stand-alone program or as a module, component, subroutine, or other unit suitable for use in a computing environment.

Elements of different implementations described herein may be combined to form other implementations not specifically set forth above. Elements may be left out of the structures described herein without adversely affecting their operation. Furthermore, various separate elements may be combined into one or more individual elements to perform the functions described herein.

What is claimed is:

1. A base station for a mobile cleaning robot, the base station comprising:
   a docking structure;
   at least two electrical contacts positioned on the docking structure, the at least two electrical contacts configured to contact corresponding electrical contacts of the mobile cleaning robot to charge the mobile cleaning robot; and
   a platform extending forward of the docking structure, the platform comprising a plurality of raised surface features to support a cleaning pad mounted to the mobile cleaning robot, wherein the plurality of raised surface features are positioned to contact the cleaning pad of the mobile cleaning robot.

2. The base station of claim 1, wherein each of the plurality of raised surface features includes a dome-shaped portion and has a height between 2 and 6 millimeters.

3. The base station of claim 1, wherein the plurality of raised surface features are configured to tilt a forward portion of the mobile cleaning robot into a charging position.

4. The base station of claim 3, wherein configurations of the plurality of raised surface features to tilt the forward portion of the mobile cleaning robot comprise configurations to tilt a rearward portion of the mobile cleaning robot such that the corresponding electrical contacts of the mobile cleaning robot apply a downward force on the at least two electrical contacts of the base station sufficient to electrically connect the corresponding electrical contacts of the mobile cleaning robot and the at least two electrical contacts of the base station.

5. The base station of claim 1, wherein the plurality of raised surface features comprise:
   a leftward set of raised surface features,
   a central set of raised surface features, and
   a rightward set of raised surface features,
   wherein the leftward set of raised surface features is spaced apart from the central set of raised surface features to provide a path along the platform for a first wheel of the mobile cleaning robot, the path being positioned between the leftward set of raised surface features and the central set of raised surface features and being at least as wide as the first wheel of the mobile cleaning robot, and
   wherein the rightward set of raised surface features is spaced apart from the central set of raised surface features to provide a path along the platform for a second wheel of the mobile cleaning robot, the path being positioned between the rightward set of raised surface features and the central set of raised surface features and being at least as wide as the second wheel of the mobile cleaning robot.

6. The base station of claim 1, wherein the plurality of raised surface features comprise a first set of raised surface features and a second set of raised surface features,
   wherein the first set of raised surface features is spaced apart from the second set of raised surface features to provide a path along the platform for a wheel of the mobile cleaning robot, the path being positioned between the first set of raised surface features and the second set of raised surface features and being at least as wide as the wheel of the mobile cleaning robot.

7. The base station of claim 1, wherein the plurality of raised surface features are arranged along a plurality of parallel rows each extending horizontally across a width of the base station.

8. The base station of claim 7, wherein a first set of the plurality of raised surface features along a first row of the plurality of parallel rows is staggered relative to a second set of the plurality of raised surface features along a second row of the plurality of parallel rows.

9. The base station of claim 7, wherein the plurality of parallel rows comprise at least three parallel rows.

10. The base station of claim 7, wherein a maximum height of a first set of the plurality of raised surface features along a first row of the plurality of parallel rows is less than a maximum height of a second set of the plurality of raised surface features along a second row of the plurality of parallel rows, the second row positioned rearward of the first row.

11. The base station of claim 1, wherein the docking structure comprises a horizontal surface along which the at least two electrical contacts are positioned.

12. The base station of claim 1, wherein the plurality of raised surface features are positioned forward of a rear surface of the platform, and the at least two electrical contacts are positioned above the rear surface of the platform, the rear surface of the platform being raised relative to a forward portion of the platform.

13. The base station of claim 1, wherein the platform is configured to be disconnected from the docking structure.

14. The base station of claim 1, wherein at least a first portion of the plurality of raised surface features are adjacent to a left outer portion of the platform, and at least a second portion of the plurality of raised surface features are adjacent to a right outer portion of the platform.

15. The base station of claim 1, further comprising a wheel well for receiving a wheel of the mobile cleaning robot as the mobile cleaning robot moves toward the at least two electrical contacts of the base station, wherein the plurality of raised surface features are positioned forward of the wheel well.

16. The base station of claim 1, wherein the platform comprises:
left and right outer portions that slope upward from a front edge of the platform, and
a fluid management area sloped downward from a forward portion of the platform,
wherein at least some of the plurality of raised surface features are positioned within the fluid management area.

17. The base station of claim 16, wherein the plurality of raised surface features are taller than the left and right outer portions of the platform.

18. The base station of claim 16, wherein the plurality of raised surface features are positioned between a fluid collection area of the fluid management area and the forward portion of the platform.

19. The base station of claim 16, wherein:
the fluid management area is at least partially defined by:
a first sloping surface tapering from the forward portion of the platform, and
a second sloping surface tapering from a rearward portion of the platform; and
at least a portion of the plurality of raised surface features is positioned along the first sloping surface.

20. A system comprising:
a base station; and
a mobile cleaning robot,
wherein the base station comprises:
a docking structure,
at least two electrical contacts positioned on the docking structure, the at least two electrical contacts configured to contact corresponding electrical contacts of the mobile cleaning robot to charge the mobile cleaning robot, and
a platform extending forward of the docking structure, the platform comprising a plurality of raised surface features to support a cleaning pad mounted to the mobile cleaning robot, wherein the plurality of raised surface features are positioned to contact the cleaning pad of the mobile cleaning robot.

21. The system of claim 20, further comprising:
a plurality of wheels to support the mobile cleaning robot on a floor surface, and
a cleaning pad holder configured to hold the cleaning pad on an underside of the mobile cleaning robot,
wherein the platform of the base station is configured to receive the plurality of wheels of the mobile cleaning robot and the cleaning pad held by the cleaning pad holder of the mobile cleaning robot.

22. The system of claim 21, wherein the plurality of raised surface features comprise a first set of raised surface features and a second set of raised surface features,
wherein the first set of raised surface features is spaced apart from the second set of raised surface features to provide a path along the platform for a wheel of the plurality of wheels of the mobile cleaning robot, the path being positioned between the first set of raised surface features and the second set of raised surface features and being at least as wide as the wheel of the mobile cleaning robot.

23. The system of claim 21, further comprising a wheel well for receiving a wheel of the plurality of wheels of the mobile cleaning robot as the mobile cleaning robot moves toward the at least two electrical contacts of the base station, wherein the plurality of raised surface features are positioned forward of the wheel well.

24. The system of claim 20, wherein the plurality of raised surface features are positioned between a fluid collection area of a fluid management area and a forward portion of the platform.

25. The system of claim 20, wherein the plurality of raised surface features are taller than left and right outer portions of the platform.

* * * * *